United States Patent
Boudard et al.

(10) Patent No.: US 9,440,513 B2
(45) Date of Patent: Sep. 13, 2016

(54) ABSORPTION PLATE FOR AN AIR CONDITIONER

(75) Inventors: Emmanuel Boudard, Voisins le Bretonneux (FR); Marc Gohlke, Collonges Au Mont D Or (FR); Remi Goulet, Versailles (FR); Xavier Dumont, Montrouge (FR); Manuel Martinez, Issy-les-moulineaux (FR)

(73) Assignee: Peugeot Citroën Automobiles SA, Route de Gisy, Velizy Villacoublay (FR)

( * ) Notice: Subject to any disclaimer, the term of this patent is extended or adjusted under 35 U.S.C. 154(b) by 203 days.

(21) Appl. No.: 14/234,229

(22) PCT Filed: Jul. 23, 2012

(86) PCT No.: PCT/FR2012/051752
§ 371 (c)(1),
(2), (4) Date: Mar. 12, 2014

(87) PCT Pub. No.: WO2013/014386
PCT Pub. Date: Jan. 31, 2013

(65) Prior Publication Data
US 2015/0336444 A1    Nov. 26, 2015

(30) Foreign Application Priority Data
Jul. 26, 2011 (FR) ..................... 11 56835

(51) Int. Cl.
*F25B 15/00* (2006.01)
*B60H 1/32* (2006.01)
(Continued)

(52) U.S. Cl.
CPC ........... *B60H 1/3201* (2013.01); *B01D 53/263* (2013.01); *B01D 53/28* (2013.01);
(Continued)

(58) Field of Classification Search
CPC ........ F25B 37/00; F25B 15/10; F25B 35/00; F25B 35/02; B60H 1/3201
USPC .......................... 62/494, 497, 484, 485, 487
See application file for complete search history.

(56) References Cited

U.S. PATENT DOCUMENTS 2,466,541 A * 4/1949 Gaugler ................. F25B 33/00
                                                  62/491
4,223,539 A    9/1980 Webb et al.
(Continued)

FOREIGN PATENT DOCUMENTS

| DE | 102008044482 A1 | 3/2010 |
| EP | 2213963 A1 | 8/2010 |
| FR | 2941773 A1 | 8/2010 |

OTHER PUBLICATIONS

International Search Report of corresponding application PCT/FR2012/051752 dated Oct. 24, 2012.
(Continued)

*Primary Examiner* — Orlando Aviles Bosques
(74) *Attorney, Agent, or Firm* — Polster, Lieder, Woodruff & Lucchesi, LC

(57) ABSTRACT

An absorption plate for a vehicle is crossed by a stream of liquid absorbent fluid flowing between two exchange surfaces arranged relatively opposite one another. The exothermal absorption of a coolant fluid in vapor phase takes place through the exchange surfaces by increasing a concentration of the coolant fluid in the absorbent fluid. The relative arrangement of the two exchange surfaces forces at least one portion of the stream of absorbent fluid to pass at least once through one of the exchange surfaces and causes mixing of the stream of the absorbed fluid.

4 Claims, 2 Drawing Sheets

(51) Int. Cl.
*B60H 1/00* (2006.01)
*F25B 37/00* (2006.01)
*B01D 53/26* (2006.01)
*B01D 53/28* (2006.01)
*F25B 15/10* (2006.01)
*F25B 35/00* (2006.01)
*F25B 35/02* (2006.01)

(52) U.S. Cl.
CPC ........... *B60H1/00342* (2013.01); *F25B 37/00* (2013.01); *B01D 2251/302* (2013.01); *B01D 2251/60* (2013.01); *B01D 2252/10* (2013.01); *B01D 2257/80* (2013.01); *B01D 2259/4566* (2013.01); *F25B 15/10* (2013.01); *F25B 35/00* (2013.01); *F25B 35/02* (2013.01)

(56) References Cited

U.S. PATENT DOCUMENTS

| | | | | |
|---|---|---|---|---|
| 6,314,752 | B1* | 11/2001 | Christensen | F25B 15/00 62/484 |
| 2005/0268633 | A1* | 12/2005 | Smith | B60H 1/3201 62/480 |
| 2009/0199589 | A1 | 8/2009 | Cossenet et al. | |

OTHER PUBLICATIONS

Written Opinion of corresponding application PCT/FR2012/051752 dated Feb. 27, 2014 per WIPO.

* cited by examiner

ABSORPTION PLATE FOR AN AIR CONDITIONER

CROSS-REFERENCE TO RELATED APPLICATIONS

This is the US National Stage under 35 U.S.C. §371 of PCT/FR2012/051752, filed Jul. 23, 2012, which, in turn, claims priority to French Application No. 1156835 filed Jul. 26, 2011.

BACKGROUND

The present invention relates in a general manner to an absorption plate for an air conditioner mounted in an automobile vehicle.

Devices for air conditioning by absorption are known from the prior art. For example, the document FR 2 941 773 describes an absorption air conditioner comprising absorption plates in which an absorbent fluid, lithium bromide, circulates and absorbs a coolant fluid, water vapor. On the other hand, this system has in particular the disadvantage of being limited by the absorptive capacity of the absorbing fluid coolant effectiveness. In fact, during the exothermic absorption reaction on the surface, the absorbent fluid, lithium bromide, in contact with the coolant fluid, water vapor, heats up and the surface layer is rapidly saturated with coolant fluid. The absorption is limited by the transfer rate to the center of the stream of heat released and/or of the coolant fluid. The result is a rather weak global efficiency of the system because the transfer rate (of the heat released and of the coolant fluid absorbed) in the direction of the center of the stream of absorbent solution greatly limits the capacities of absorption during the traversing of the plate, that has a limited height in order to reduce the bulkiness of the system.

Furthermore, the document U.S. Pat. No. 4,223,539 describes another type of air conditioner by absorption in which the absorbent fluid is projected onto coolant tubes where it flows and absorbs the coolant fluid and the surface of these tubes comprise protuberances that create a turbulence. Such an implementation is expensive because the process for manufacturing protuberances on the surface of a tube is not easy to implement and its feasibility on an industrial scale has not been demonstrated. Furthermore, this implementation connects the protuberances to the surface on which the fluid flows and this makes any modification of the protuberances or of the surface difficult. This also complicates the supply of the tubes because the complexity of such a component limits the number of suppliers. Therefore, this implementation cannot be adapted to the automobile area, where the flexibility and the expense are parameters that direct the design. Finally, the bulkiness of such a system does not allow it to be integrated into a vehicle, taking into account the geometric constraints.

SUMMARY

An air conditioner by absorption is disclosed that addresses the disadvantages of the documents of the prior art mentioned above. In particular, first of all, an air conditioner by absorption is proposed that has an elevated absorption yield without requiring complex components for its implementation.

For this, a first aspect of the air conditioner, in particular of an air conditioner by absorption for a vehicle, relates to an absorption plate traversed by a stream of a liquid absorbent fluid flowing between two exchange surfaces arranged relative to one another whereby the exothermic absorption of a coolant fluid in vapor phase takes place through these two exchange surfaces by increasing a concentration of coolant fluid in the absorbent fluid. The relative arrangement of the two exchange surfaces forces at least a portion of the stream of absorbent fluid to pass at least once through one of the exchange surfaces and causes a mixing of the stream of absorbent fluid. The plate improves the efficiency of the absorption by the absorbent fluid by mixing the stream along the exchange surface. In other words, due to the relative arrangement of the two exchange surfaces, the temperature of the absorbent fluid and/or the concentration of coolant fluid in the absorbent fluid tends to be homogeneous locally, laterally and immediately downstream from the mixing zone on account of the mixture caused in such a manner that there is little difference of temperature and of concentration between the surface layer and the zone in the center of the film. The absorption plate is economical to implement because it is the arrangement of the exchange surfaces that forces the flow to pass through the exchange surfaces, which causes the mixture and there are no supplementary components to be integrated in the plates. The implementation of the absorption plate is particularly adapted to the automobile area because it allows for obtaining good yields while being very compact.

In an advantageous manner the relative arrangement of the exchange surfaces defines a passage section between the exchange surfaces for the stream of absorbent fluid, and the relative arrangement of the two exchange surfaces causing a mixture of the stream of absorbent fluid defines a reduction of the passage section between the exchange surfaces for the stream of absorbent fluid. This reduction can be followed by an increase in width of the passage section. The reduction in width causes the passage section of the stream through the exchange surfaces, which has the effect of causing a mixture that tends to homogenize the temperature of the absorbent fluid and/or the concentration of coolant fluid in the absorbent fluid. The subsequent increase in width of the passage section brings about a second mixing that further increases the efficiency of the stirring of the stream of absorbent fluid. It is to be noted that this increase of section can be caused by the surface tension or capillary pressure of the absorbent fluid interacting with the grills.

In an advantageous manner the passage section is defined by a distance (i.e., a width) between the exchange surfaces. The relative arrangement of the two exchange surfaces causes a mixing of the stream of absorbent fluid to be formed due to a local reduction of the distance between the exchange surfaces. This reduction of the distance between the exchange surfaces can be followed by an increase of the distance. This implementation of the invention can be economically realized.

In an advantageous manner the exchange surfaces are locally joined. The efficiency of the absorption plate is maximized because the entire stream of absorbent fluid will have to traverse the exchange surfaces, which causes an optimal stirring.

The exchange surfaces advantageously have a width perpendicular to the stream of absorbent fluid and the exchange surfaces are joined (i.e., connected) over the entire width of the exchange surfaces. The stream is totally mixed because the exchange surfaces are joined over the entire width of the plate. This operation can be realized in a single pass and is the simplest embodiment.

Alternatively or additionally, the exchange surfaces have a width perpendicular to the stream of absorbent fluid and the exchange surfaces are joined in a direction perpendicular to the stream locally on a joining length less than the width of the exchange surfaces. This implementation can be established locally and allows specific configurations.

The exchange surfaces are advantageously grills. Grills are well-suited for realizing the exchange surfaces and the stream of absorbent fluid can readily traverse them for the implementation of the invention.

A second aspect of the invention is an automobile vehicle comprising at least one air conditioner in accordance with the first aspect of the invention.

A last aspect of the invention is an automobile vehicle comprising at least one air conditioner in accordance with the second aspect of the invention.

DESCRIPTION OF THE DRAWINGS

Other characteristics and advantages of the present invention will appear more clearly from a reading of the following detailed description of an embodiment of the invention given as a non-limiting example and illustrated by the attached drawings, in which.

DETAILED DESCRIPTION

Figure 1:
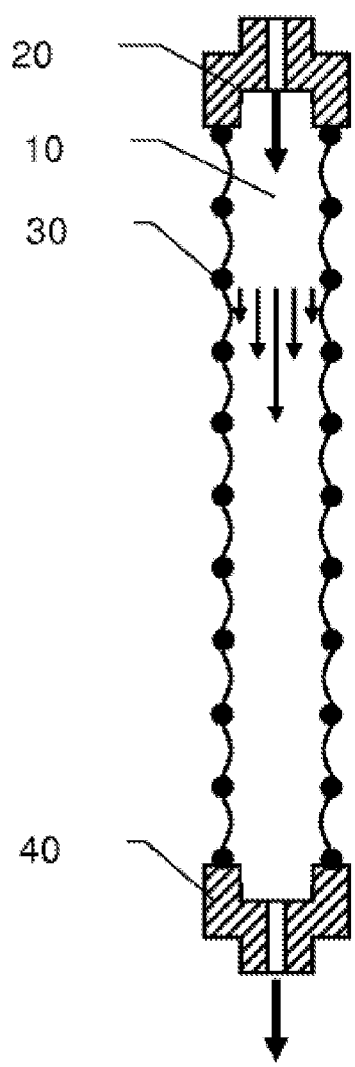
FIG. 1 shows an absorption plate in accordance with the prior art.

FIG. 1 shows an absorption plate like those known in the prior art. Two grills 30 define a conduit through which a stream of absorbent fluid 10, lithium bromide for example, circulates by gravity. A frame integrates the grills 30 and the upper part 20 of the frame comprises a feed hole through which the absorbent fluid enters between the two plates. The lower part 40 of the frame comprises an evacuation hole connected to the rest of the absorbent fluid circuit. The flow between the two plates is essentially laminar, as is indicated by the arrows between the grills 30. The plate is arranged in a reservoir containing a gaseous phase rich in coolant vapor. This can be water in the form of vapor, for example.

During the course of its path between the two plates, the lithium bromide absorbs water through the grills 30 in the external layer of the lithium bromide stream. The lithium bromide becomes charged with water and the water concentration of the saline solution of lithium bromide increases as well as its temperature. The absorption capacity is limited by the transfer rate in the direction of the center of the stream of saline solution of the coolant absorbed on the surface of the saline solution and of the heat released. In the case of a stream of lithium bromide that is laminar or slightly unstable, the heat released on the surface and the absorbed coolant diffuse very slowly in the direction of the center of the stream of saline solution.

Figure 2:
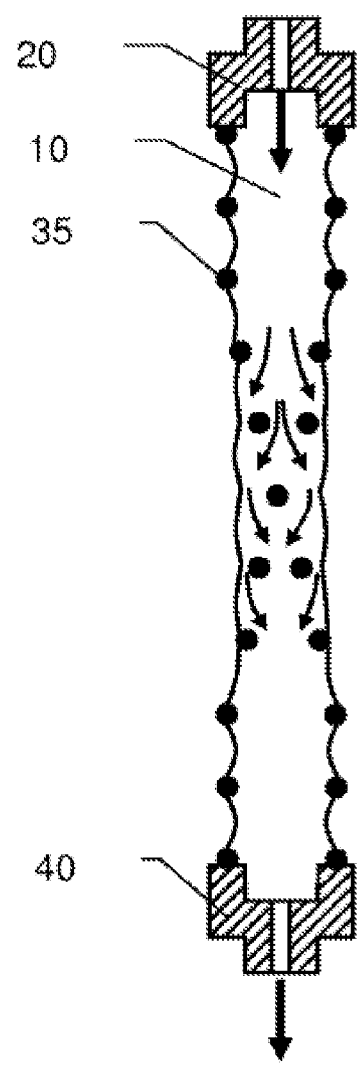
FIG. 2 shows an absorption plate in accordance with a first embodiment of the invention.
Figure 4:
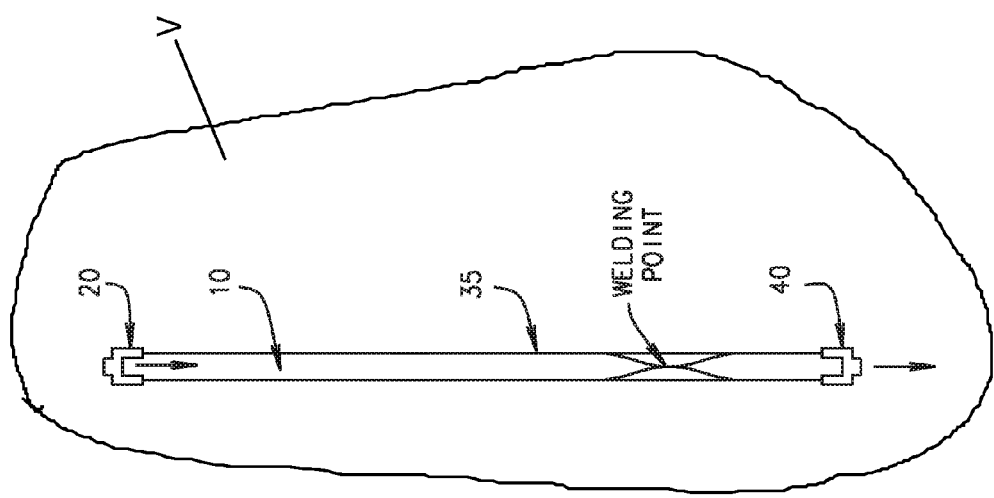
FIG. 4 shows an end view of the absorption plate in accordance with the first embodiment of the invention.
Figure 3:
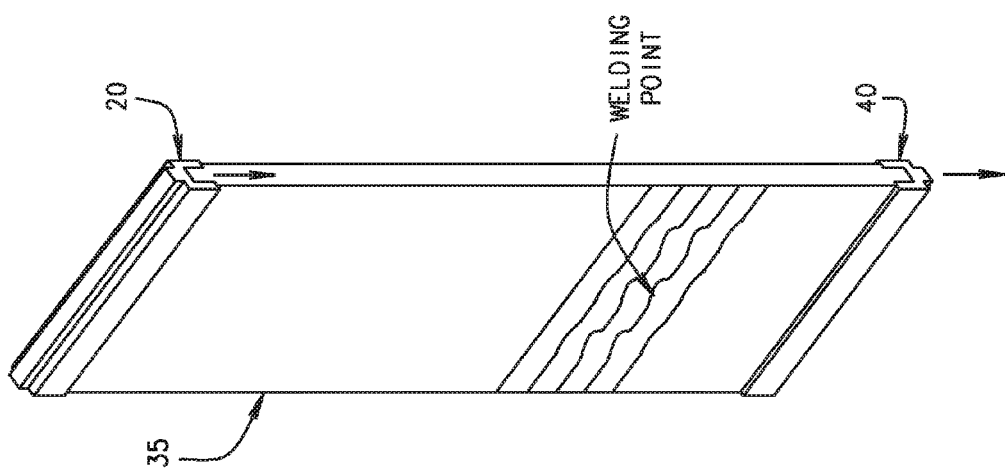
FIG. 3 shows a perspective view of the absorption plate in accordance with the first embodiment of the invention.

FIGS. 2-4 show an illustrative embodiment of an absorption plate for a vehicle V in which the two grills 35 are arranged facing one another and joined until they are touching in such a manner that the entire stream of absorbent fluid must transverse (or pass through) the two grills 35, that will bring about a mixing and a homogenization of the temperature and/or of the concentration of water in the lithium bromide. The external layer of the stream is mixed into the rest of the stream and the temperature and/or the concentration of water of the lithium bromide is lowered in the zone in proximity with the surface of the stream of absorbent fluid, which permits the efficiency of the absorption and of the air conditioner to be increased. The two grills 35 then move away from one another and the stream of absorbent fluid passes through the grills 35 for a second time, which brings about a second mixing.

It is understood that various modifications and/or improvements obvious to the person skilled in the art can be made to the different embodiments of the invention described in the present specification without departing from the scope of the invention defined by the attached claims. In particular, the multiplying of the mixing zones on one and the same plate (over the total width and over a length lower than the latter) can be envisaged.

The invention claimed is:

1. An absorption plate for an air conditioner by absorption for a vehicle, the absorption plate comprising a frame having an upper body having a feed hole, said feed hole defining an entrance receiving a liquid absorbent fluid from outside the absorption plate, a lower body having an evacuating hole, wherein said evacuating hole defines an exit through which the liquid absorbent fluid exits the absorption plate, wherein said upper body is different from and is vertically spaced apart from said lower body, and the absorption plate further comprises a first and a second exchange surfaces extending between and in direct contact with each of said upper and lower bodies; said first and second exchange surfaces are on opposite sides of the absorption plate; whereby said frame defines a flow path for said liquid absorbent fluid extending between the first and second exchange surfaces from said entrance to said exit; said frame defining a distance between said exchange surfaces, and wherein said distance is a width of said flow path; said absorption plate including a junction point between said upper and lower bodies at the center of said width, wherein said exchange surfaces are locally joined at said junction point, such that said flow path includes an area of reducing said width before the junction point and an area of increasing said width after said junction point; wherein said area of reducing said width is formed by a first angled portion of the first exchange surface and a first angled portion of said second exchange surface; wherein the first angled portion of the first exchange surface is angled toward the second exchange surface and the first angled portion of the second exchange surfaces is angled toward the first exchange surface; and wherein said area of increasing width is formed by a second angled portion of the first exchange surface and a second angled portion of said second exchange surface; wherein the second angle portion of the first exchange surface is angled away from the second exchange surface and the second angled portion of the second exchange surface is angled away from the first exchange surface;

wherein the absorption plate is comprised in said vehicle and said absorption plate is configured to have a stream of said liquid absorbent fluid flowing along said path, and an exothermic absorption of a coolant fluid in vapor phase taking place through the opposed exchange surfaces by increasing a concentration of coolant fluid in the absorbent fluid, and wherein the junction point of the two exchange surfaces forces at least a portion of the stream of absorbent fluid to pass at least once through one of the exchange surfaces and causes a mixing of the stream of absorbent fluid.

2. The absorption plate according to claim 1, wherein the vehicle is an automobile vehicle, and wherein the automobile vehicle comprises said air conditioner by absorption, and at least one of said absorption plate is comprised in said air conditioner by absorption.

3. The absorption plate according to claim 1, wherein the exchange surfaces are grills.

4. An automobile vehicle comprising at least one air conditioner by absorption, said at least one air conditioner by absorption comprising at least one absorption plate of claim 1.

\* \* \* \* \*